United States Patent [19]

Shimizu et al.

[11] Patent Number: 4,741,666
[45] Date of Patent: May 3, 1988

[54] VARIABLE DISPLACEMENT TURBOCHARGER

[75] Inventors: Masami Shimizu, Chiba; Kinshi Takagi, Tokyo; Nobuhiro Kondo, Noda; Hiromu Furukawa, Yokohama, all of Japan

[73] Assignee: Ishikawajima-Harima Jukogyo Kabushiki Kaisha, Japan

[21] Appl. No.: 943,788

[22] Filed: Dec. 19, 1986

[30] Foreign Application Priority Data

Dec. 23, 1985 [JP] Japan .............................. 60-198517[U]
Dec. 25, 1985 [JP] Japan .............................. 60-199975[U]
Dec. 25, 1985 [JP] Japan .............................. 60-199976[U]
Apr. 17, 1986 [JP] Japan .............................. 61-57923[U]

[51] Int. Cl.⁴ ............................................. F03D 7/00
[52] U.S. Cl. ................................... 415/158; 415/165; 415/166
[58] Field of Search ............... 415/148, 157, 158, 164, 415/165, 166, 219 R

[56] References Cited

U.S. PATENT DOCUMENTS 3,307,828  3/1967  Willi ..................... 415/164
4,102,599  7/1978  Ziegler ................. 415/219 R
4,575,307  3/1986  Shinohara ............ 415/165
4,629,396  12/1986 Lorett ................... 415/164
4,657,480  4/1987  Pfeil ..................... 415/164
4,685,869  8/1987  Sasaki .................. 415/164

FOREIGN PATENT DOCUMENTS 149035  4/1981  Japan .
130030  9/1983  Japan .
 19928  2/1984  Japan .
 64433  4/1984  Japan .
 64434  4/1984  Japan .

Primary Examiner—Larry I. Schwartz

[57] ABSTRACT

A turbine casing, a shroud and a gas outlet cover together define a closed doughnut-shaped space. A nozzle driving ring inserted in the space is slidably clamped by the turbine casing and the gas outlet cover. Nozzle shafts extending from nozzle blades are connected through links to the nozzle driving ring. The nozzle driving ring can be driven from outside the space. The nozzle driving ring for simultaneously varying the angle of the nozzle blades is restrained in the axial direction effectively with a high degree of accuracy.

15 Claims, 9 Drawing Sheets

VARIABLE DISPLACEMENT TURBOCHARGER

BACKGROUND OF THE INVENTION

The present invention relates to a turbocharger and more particularly a variable displacement turbocharger.

Turbochargers, which serve to improve thermal efficiency of various types of prime movers, are driven by exhaust gases from the prime movers. The flow rate of exhaust gases from a prime mover varies depending upon a load on the prime mover so that conventionally part of the performance of the turbocharger is sacrificed. To overcome this problem, recently developed are variable displacement turbochargers in which the angle of nozzle blades can be varied depending upon a load on a prime mover so as to optimumly control a flow rate of exhaust gases flowing to a turbine wheel, whereby a high degree of thermal efficiency can be maintained all the time.

FIGS. 11 and 12 show a turbine unit of a variable displacement turbocharger of the type described above in which a shroud 3 is clamped between a turbine casing 1 and a gas outlet cover 2 and rotatably carries nozzle shafts 4 through bearings 5. A nozzle blade 6 is securely attached to one end of the nozzle shaft 4 on the side of the turbine casing 1 while a nozzle link 7 is attached to the other end of the nozzle shaft 4 on the side of the gas outlet cover 2.

A doughnut-shaped space 8 defined between the gas outlet cover 2 and the shroud 3 accomodates the nozzle links 7 as well as a nozzle driving ring 9 positioned and rotatably supported by projections of the bearings 5. The nozzle driving ring 9 is connected through intermediate links 10 to the nozzle links 7. Reference numeral 11 represents a turbine wheel.

Rotation of the nozzle driving ring 9 by an external drive source through a lever 13 causes the nozzle blades 6 to angle-displace through the nozzle links 7 by an angle corresponding to the angle of rotation of the nozzle driving ring 9.

Therefore when the nozzle driving ring 9 is rotated in response to the load on the prime mover, the angle of the nozzle blades 6 is changed to optimize a flow rate and an entering angle of the exhaust gases flowing into the turbine wheel 11, whereby the efficiency of the turbocharger can be improved.

In the variable displacement turbocharger of the type described above, the nozzle driving ring 9 is axially restrained by the nozzle links 7 and the intermediate links 10. This restraint is not so severe because of plays between the bearings 5 and nozzle shafts 4, between the intermediate links 10 and nozzle driving ring 9 and between the nozzle links 7 and the intermediate links 10. Therefore there is a fear that vibrations of the turbocharger may occur during the operation. The axial vibratory load of the relatively heavy nozzle driving ring 9 is received by these links, which may cause damage of connections between the links and wear of the sliding component parts.

High temperature exhaust gases flow through the turbine casing 1 so that the turbine casing 1 as well as the shroud 3 which is in intimate contact therewith and is partly exposed to the exhaust gases become high-temperatured. As the result, temperature of the bearings 5 on the shroud 3 also rises. The nozzle driving ring 9, which is supported by the bearings 5 as described above, is not directly exposed to the exhaust gases and is raised in temperature later than the turbine casing 1 and the shroud 3. As a result, positions of the bearings 5 may be deviated in the radial direction and inside the nozzle driving ring 9 which is not yet thermally expanded out so that the space between the inner surface of the nozzle driving ring 9 and the outer peripheral surfaces of the bearings 5 disappears, resulting in sticking between the nozzle driving ring 9 and the bearings 5.

Moreover, in the conventional turbocharger, the vertical weight (gravity) exerted to the nozzle driving ring 9 is received by a few of bearings 5 at their upper extremity positions through a line contact between the nozzle driving ring 9 and these bearings 5 so that the pressure loaded on these bearings 5 is considerably great. Therefore when the nozzle driving ring 9 is rotated to cause sliding contacts between the same and the bearings 5, wear therebetween tends to progress. If the sliding contact surfaces of the bearings 5 are worn, the center of the nozzle driving ring 9 is offset so that the angles of the nozzle blades depending upon the angle of rotation of the nozzle driving ring 9 become nonuniform. As a result, the turbocharger cannot exhibit a desired performance.

Furthermore, in the case of the angle-displaceable nozzle blade structure, when the opening angle of the nozzle blades is too much, the nozzle blades may damageably contact the turbine wheel. It follows therefore that control of the opening angle of the nozzles blades is needed for prevention of contact between the nozzles blades and the turbine wheel. In the turbocharger of the type described above, the opening angle is adjusted only on the side of driving the nozzle driving ring and no angle adjustment is made on the turbine side. Therefore when the angle control on the side of driving the nozzle driving ring cannot be performed properly, the nozzle blades are caused to open so widely that they contact the turbine blade, causing damages to both the nozzle blades and the turbine wheel.

In the case of the angle-displaceable nozzle blade structure described above, the smaller the gaps between the nozzle blades 6, the turbine casing 1 and the shroud 3, the higher the effect of guiding the exhaust gases by the nozzle blades 6 becomes so that the efficiency of the turbine can be improved. Especially a gap at the root of the nozzle blade 6 (that is, the gap between the nozzle blade 6 and the shroud 3) greatly influences the guide effect in comparison with a gap at the tip of the nozzle blade 6 (that is, the gap between the nozzle blade 6 and the turbine casing 1). It follows therefore that the gap at the root of the nozzle blade 6 must be reduced as much as possible, but actually the gap between the nozzle blade and the shroud cannot be extremely reduced because of the reasons described below.

The gap varies due to thermal deformations of the shroud and the nozzle blade. The gap variation is also caused by the oxidation-roughened surfaces of the shroud and nozzle blades and by the bent nozzle shaft 4 due to wear of the bearings 5. Therefore, with the root gap being made too small, the nozzle blade 6 may contact the shroud 3 to hinder smooth changing of the angle of the nozzle blade 6 or to cause sticking between the nozzle blade 6 and shroud 3, resulting in failure of changing the angle of the nozzle blade.

Furthermore, in the case of the above-described bearing structure, the nozzle shaft 4 has a throat 40 at its end adjacent to the nozzle blade 6. The throat 40 has a diameter which is greater than that of the remainder of the nozzle shaft 4 and is substantially equal to the outer diameter of the bearing 5.

The bearing 5 is fitted into the shroud 3 to abut on the throat 40 of the nozzle shaft 4 with all the flange surface of the throat 40 being made into contact with the end surface of the bearing 5.

With this structure, the nozzle blade 6 is generally urged by the pressure of the exhaust gases toward the shroud 3 so that wear friction between the nozzle shaft 4 and the bearing 5 is great. Overall wear friction due to the nozzle blades 6 is therefore unnegligibly great and greatly influences the capacity of the driving source for driving the nozzle blades. It becomes difficult to correctly control the angle of the nozzle blade since such high wear resistance will cause a hysterisis of the movement of the nozzle blade between the nozzle blade and a nozzle blade driving mechanism.

In order to ensure the sufficiently smooth motions of the moving parts, there must be provided a suitable gap between the nozzle shaft 4 and the bearing 5. This is disadvantageous in that the exhaust gases flow through the space between the nozzle shaft 4 and the bearing 5 into the space 8 and then leak through the space between a drive shaft 41 and the bush to the exterior.

The leakage of the exhaust gases causes contamination of the surrounding atmosphere and is dangerous because the temperature of the exhaust gases is high.

In view of the above, a primary object of the present invention is to restrain the nozzle driving ring in the axial direction effectively and with a high degree of accuracy.

A second object of the present invention is to ensure smooth rotation of the nozzle driving ring all the time without causing sticking, thereby varying the angle of the nozzle blade easily and accurately.

A third object of the present invention is to control maximum opening angle of the nozzle blade on the side thereof, thereby positively preventing the contact between the nozzle blade and the turbine wheel.

A fourth object of the present invention is to avoid contact between the nozzle blade and the shroud and to decrease wear friction between the nozzle blade and the bearing.

A fifth object of the present invention is to prevent leakage of exhaust gases from the mechanism for angle-displacing the nozzle blade.

DETAILED DESCRIPTION OF THE PREFERRED EMBODIMENT

Figure 1:
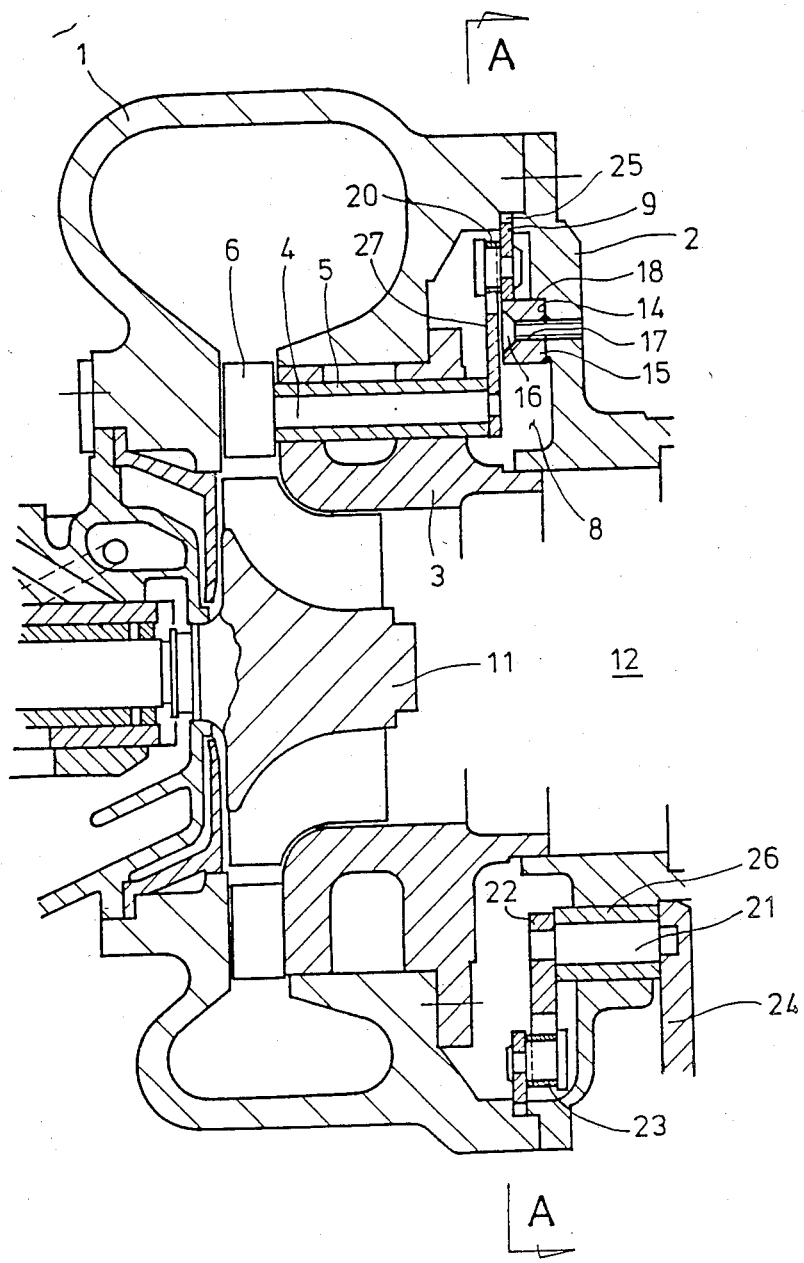
FIG. 1 is a sectional view illustrating major component parts of a variable displacement turbocharger in accordance with the present invention.
Figure 2:
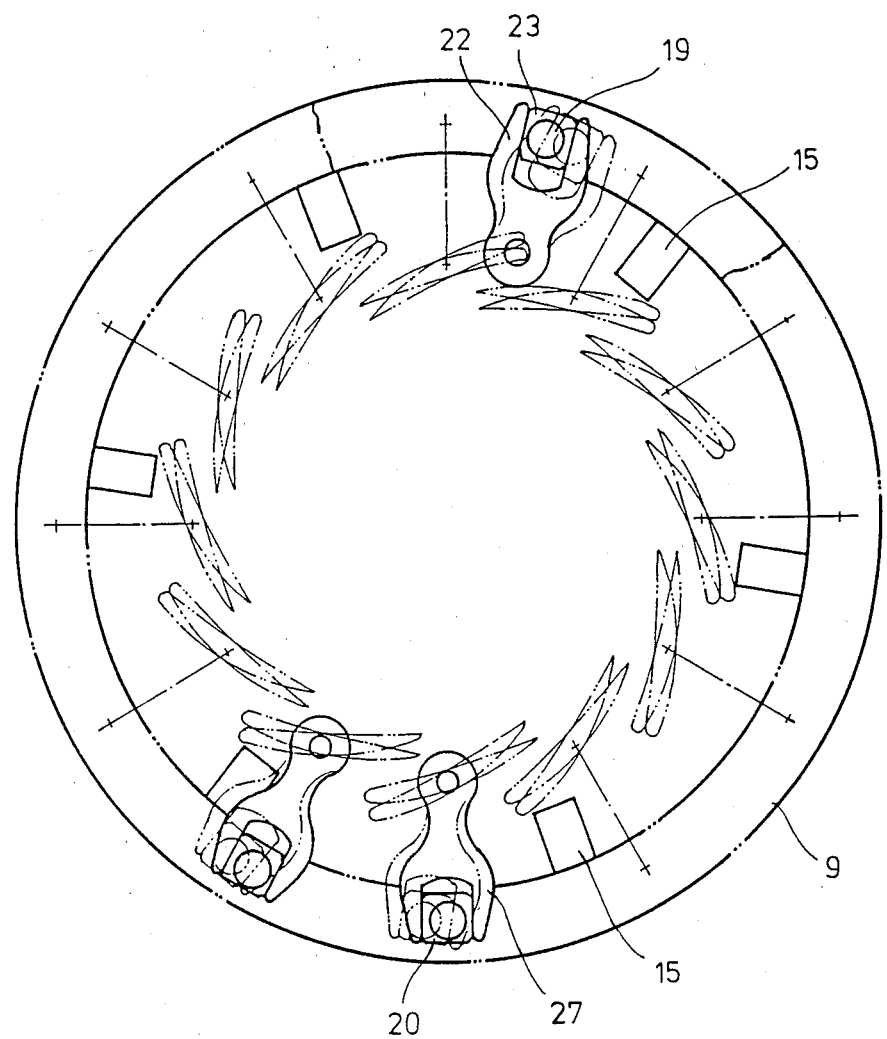
FIG. 2 is a sectional view taken along the line A—A of FIG. 1.

Referring first to FIGS. 1 and 2, a shroud 3 is fitted into a turbine casing 1 coaxially thereof and a gas outlet cover 2 is attached to the turbine casing 1. The shroud 3 and the gas outlet cover 2 define a gas outlet 12 while the turbine casing 1, the shroud 3 and the outlet cover 2 defines a space 8. Bearings 5 are fitted into the shroud 3 along its periphery at a predetermined pitch. A nozzle shaft 4 extending from each nozzle blade 6 is fitted into the bearing 5. A forked nozzle link 27 is attached to an end of the nozzle shaft 4 extending into the space 8. The turbine casing 1 and the gas outlet cover 2 define a groove 25 into which the periphery of a nozzle driving ring 9 is slidably fitted. The gas outlet cover 2 is formed at its inner surface with a stepped surface 14 into which centering fixtures 15 are fitted at a predetermined pitch with countersunk-head screws 16. The position of a tapped hole 17 for the screw 16 is slightly offset in the radial direction so that when the centering fixture 15 is securely held in position by the screw 16, the centering fixture 15 is pressed against a step 18 by the tapered surface of the screw head. In this case, when the stepped portion 18 is defined with a high degree of dimensional accuracy, the centering fixture 15 can be positioned at a high degree of accuracy.

The nozzle driving ring 9 slidably contacts at its inner peripheral surface the centering fixtures 15 to thereby be centered. Thus, the nozzle driving ring 9 is axially and radially positioned by the turbine casing 1, the gas outlet cover 2 and the centering fixtures 15. A dog 20 is rotatably mounted by a pin 19 on the nozzle driving ring 9 and is fitted into the forked leading end of the nozzle link 27.

A shaft 21 is attached through a bearing 26 to the gas outlet cover 2 and has a forked driving link 22 securely fitted to the inner end of the shaft. The forked leading end of the driving link 22 is engaged with a dog 23 pivotably attached to the nozzle driving ring 9. A lever 24 is attached to the outer end of the shaft 21.

When the lever 24 is pivoted by an external actuator (not shown), the driving link 22 is pivoted through the shaft 21 to rotate the nozzle driving ring 9. This causes the pivotal movement of the nozzle link 27 to rotate the nozzle shaft 4, thereby changing the angle of the nozzle blade 6.

In such adjustment operation of the angle of the nozzle blade 6, the nozzle driving ring 9 is restrained radially by the centering fixtures 15 and axially by the groove 25.

The dimensions of the groove 25 defined by the turbine casing 1 and the gas outlet cover 2 can be determined with a high degree of accuracy when the turbine casing and the gas outlet cover are fabricated. Therefore the gap in the axial direction between the groove 25 and the nozzle driving ring 9 can be properly maintained and the position of the groove 25 can be determined also with a high degree of accuracy. As a result, restraint in the axial direction of the nozzle driving ring 9 can be maintained in a very satisfactory manner.

Therefore according to the embodiment of the present invention, restraint of the nozzle driving ring in the axial direction can be properly maintained so that vibrations due to plays can be prevented. Moreover, the axial vibratory load of the nozzle driving ring 9 is received not by the links but by the turbine casing 1 and the gas outlet cover 2 so that the variable displacement turbocharger in accordance with the present invention is highly reliable and dependable in operation.

Instead of the centering fixtures 15 each of which is fabricated as a separate component part, projection means fabricated integral with the gas outlet cover may be used. The projection means may be in the form of a plurality of column-shaped projections or in the form of a continuous circular ring.

The peripheral or circumferential surface of the nozzle driving ring 9 is centered by the projection or projections. There is a possibility that when the nozzle driving ring 9 is driven, the center of the peripheral or circumferential surface of the ring 9 may be deviated from the center defined by the projection or projections. Therefore, in order to ensure smooth rotation of the nozzle driving ring 9 even in the above-described off-centered situation, it suffices that the radius of the surface of contact of the projection (especially, the column-shaped projection) is smaller than the radius of the inner peripheral or circumferential surface of the nozzle driving ring 9.

Figure 3A:
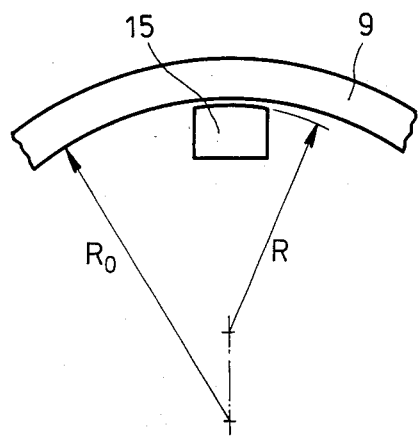
FIGS. 3(A) and 3(B) show examples of a projection.

FIG. 3(A) shows the shape of such projection 15. In this case, the relationship $R = \alpha R_o$ is maintained where R is the radius of the surface of contact; $R_o$ is the radius of the inner peripheral or circumferential surface of the nozzle driving ring 9; and $\alpha$ is a coefficient less than 1.

Figure 3B:
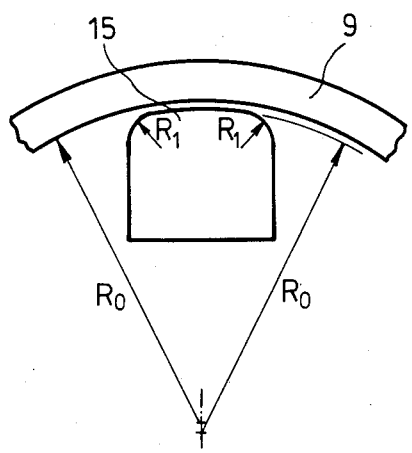

Instead of the above-described configuration, as shown in FIG. 3(B), the projection 15 may have a compound surface in which the center portion of the surface of contact has a radius $R_o$ equal to that of the inner peripheral or circumferential surface of the nozzle driving ring and the end portions have a radius $R_1$ smaller than the radius of the inner peripheral or circumferential surface of the nozzle driving ring.

Since the configurations of the projection are determined in the manner described above, the surface of contact between the nozzle driving ring and the projection or projections can be sufficiently maintained. Even when the eccentric displacement occurs in the rotation of the nozzle driving ring, galling between the nozzle driving ring and the centering fixtures can be prevented to ensure smooth rotation of the nozzle driving ring for a long period of time.

The shape or configuration of the projection can be further improved when the surface pressure exerted to the projection is taken into consideration.

Figure 4:
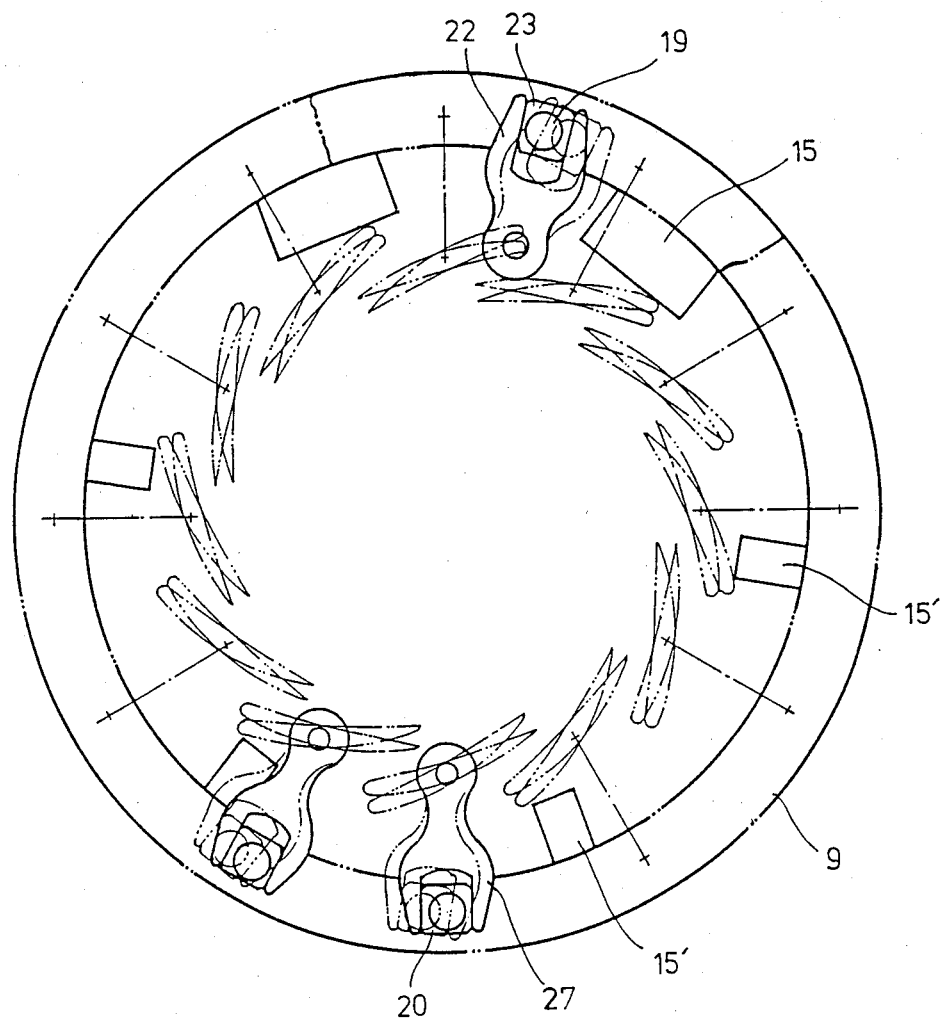
FIG. 4 shows an example of a projection arrangement.

Load is not uniformly distributed over respective projections. Depending upon the weight of the nozzle driving ring 9 and the direction of the load exerted to the ring 9, the load components exerted to the upper, lower, right and left projections are different. Therefore, a countermeasure may be taken such that, as shown in FIG. 4, two projections 15 disposed in the direction of the exerted load have a wider width and the remaining projections 15' disposed at other positions have a smaller width.

Thus, the surface pressure is uniformly distributed without increasing the overall friction resistance between the projections and the nozzle driving ring, resulting in reduction of wear to minimum.

When the sliding surfaces of the projections are hardened, wear resistance is further improved.

In order to attain control of the maximum opening degree of the nozzle blade from the side of the nozzle blade, the following means is employed.

Figure 5:
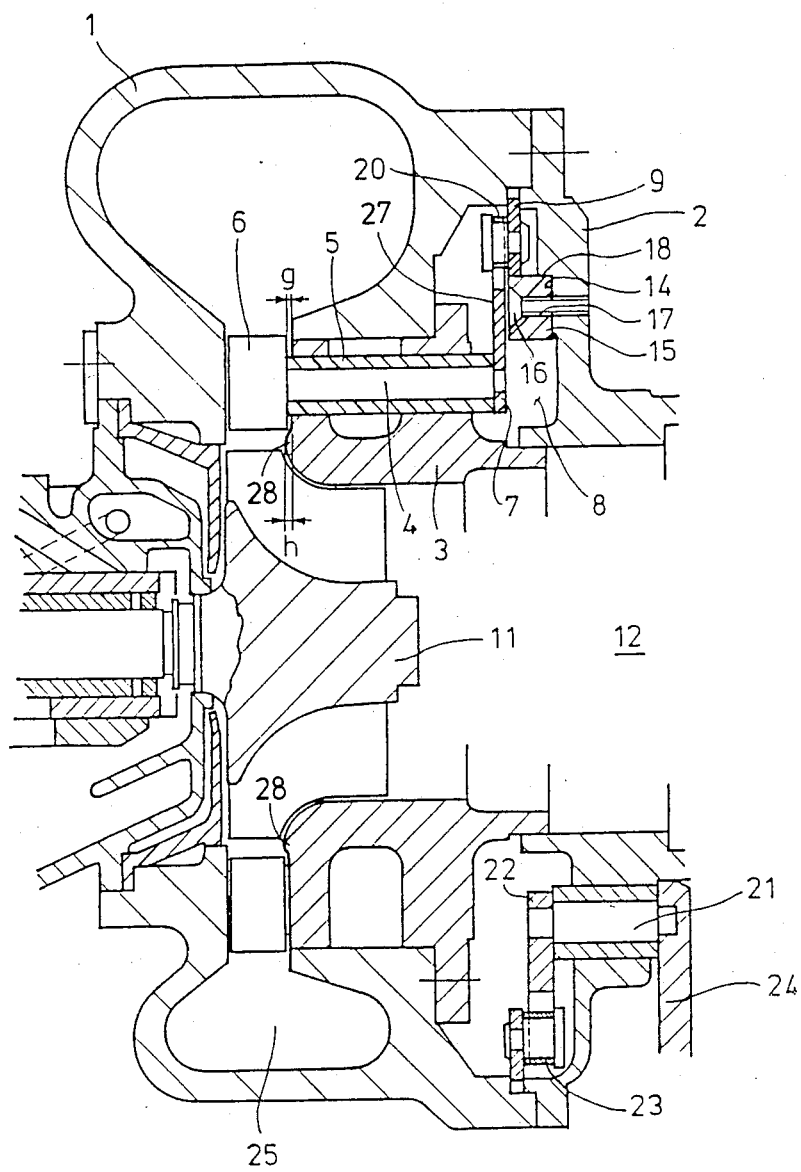
FIG. 5 is a sectional view illustrating an protruded ring portion of a shroud.

As shown in FIG. 5, a protruded ring portion 28 is defined on the shroud 3 in opposed relationship with a flow passage 25 at the inlet toward the turbine wheel 11. The height h of the protruded ring portion 28 is greater than the gap g between the nozzle blade 6 and the surface of the shroud 3 facing the flow passage 25 so that when the nozzle blade 6 is opened at its maximum opening degree, the nozzle blade 6 interferes with the protruded ring portion 28 and is prevented from being opened beyond the maximum opening degree.

The protruded ring portion 28 also serves to guide the exhaust gases leaked through the gap 9 toward the turbine wheel 11 so that the efficiency of guiding the exhaust gases is improved.

Figure 6:
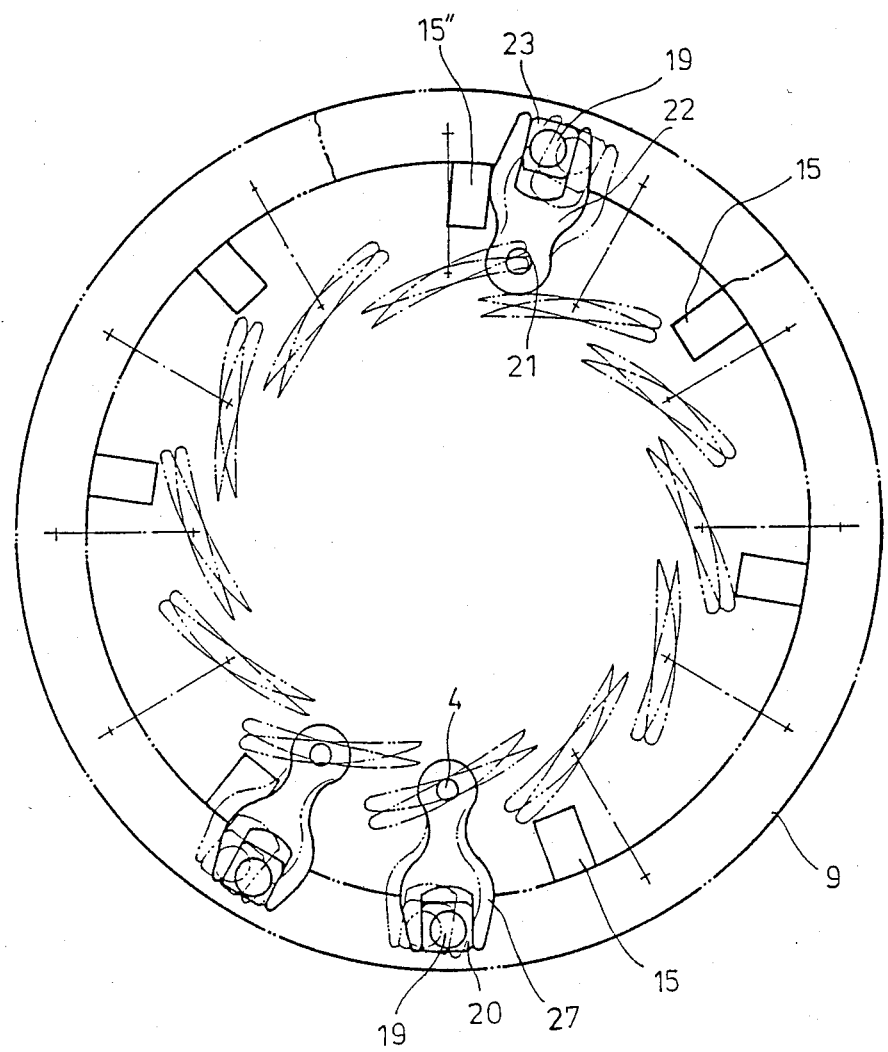
FIG. 6 is a view similar to FIG. 2 and illustrating a mechanism for restraining the opening angle of a nozzle blade.

Alternative means for controlling the maximum opening degree of the nozzle blade from the side of the nozzle blade will be described with reference to FIG. 6.

Among the projections 15, the projection 15" which is adjacent to the nozzle driving link 22 is located so as to abut on the nozzle driving link 22 when the nozzle blade 6 is opened to the maximum. Therefore when the nozzle blade 6 is opened to the maximum degree, the nozzle driving link 22 engages with the projection 15" and its further motion is restrained. When the driving link 22 is restrained, the movements of the nozzle driving ring 9 and the nozzle blades 6 are also restrained. As a result, there is no fear that the nozzle blade 6 is opened in excess of its maximum opened angle so that the nozzle blades 6 and the turbine wheel 11 can be prevented from being damaged due to contact therebetween.

Figure 7:
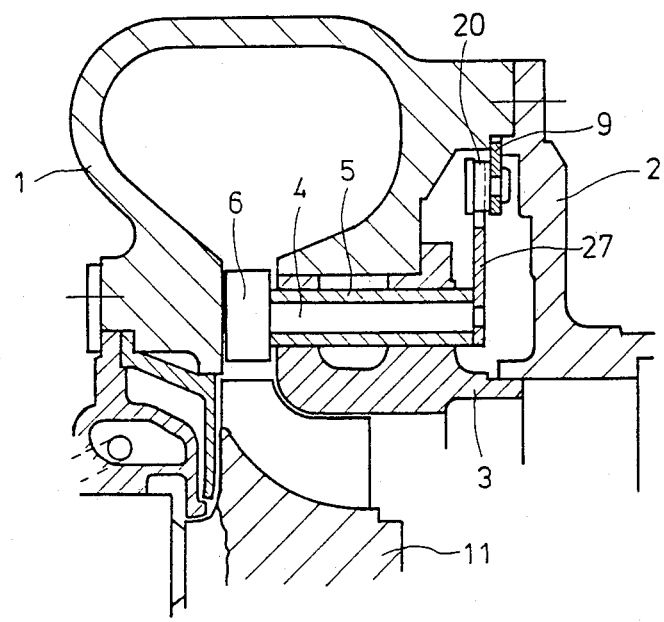
FIG. 7 is a fragmentary sectional view of a nozzle blade bearing.

In order to attain the fourth object of the present invention, the variable desplacement turbocharger is so designed and constructed as shown in FIG. 7. The nozzle shaft 4 having a uniform diameter throughout its length is attached to the nozzle blade 6 and is rotatably supported by the bearing 5 and the end face of the bearing 5 directly contacts the nozzle blade 6 so that the surface of contact is considerably decreased and wear resistance is also reduced in driving the nozzle blade.

Figure 8:
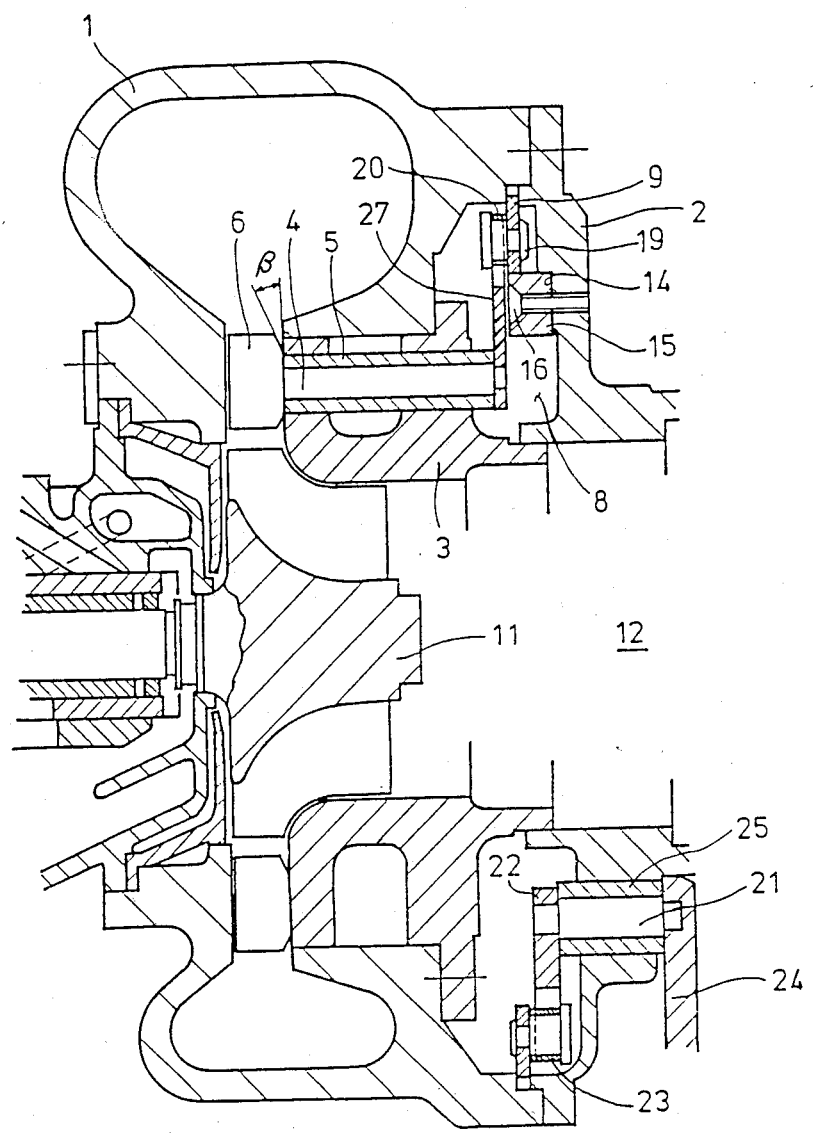
FIG. 8 is a view illustrating a configuration of a nozzle blade.

In order to prevent the contact between the surface of the shroud and the surface of the nozzle blade due to the variation of the gap therebetween, as shown in FIG. 8, the side surface of the nozzle blade adjacent to the shroud is inclined in the direction away from the surface of the shroud, thereby defining a gap (See $\beta$ in FIG. 8).

Figure 9:
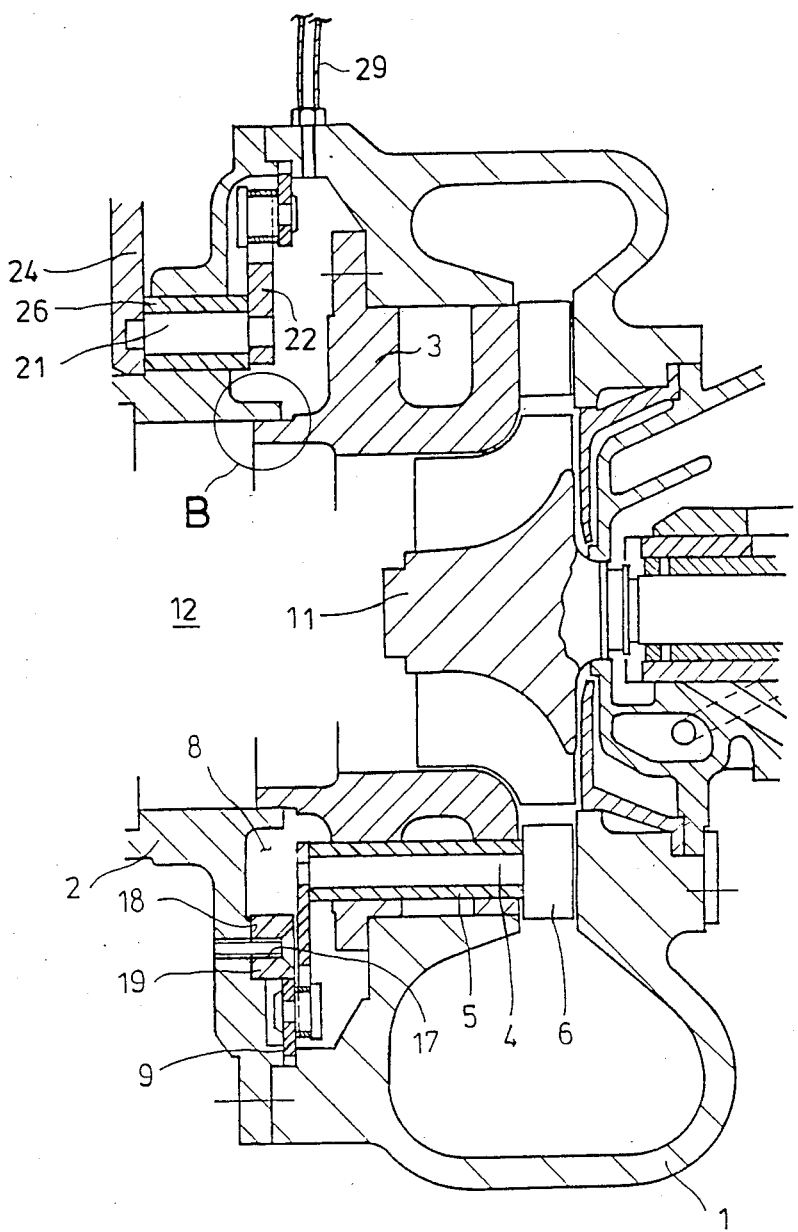
FIG. 9 is a sectional view of a variable displacement turbocharger incorporating means for preventing the leakage of exhaust gases.
Figure 10:
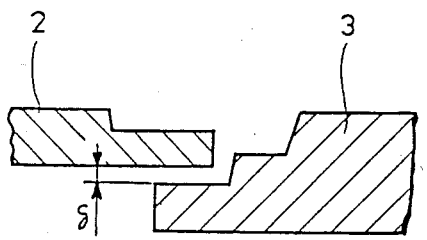
FIG. 10 is a view illustrating alternative means for preventing the leakage of exhaust gases at a portion corresponding to a circle B in FIG. 9.
Figure 11:
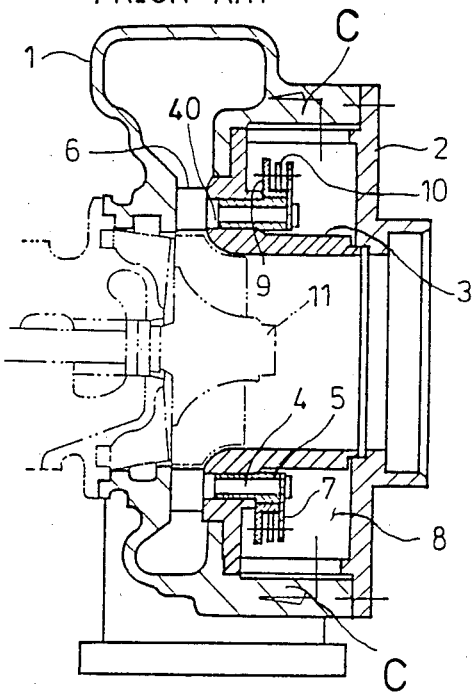
FIG. 11 is a sectional view of a conventional variable displacement turbocharger.
Figure 12:
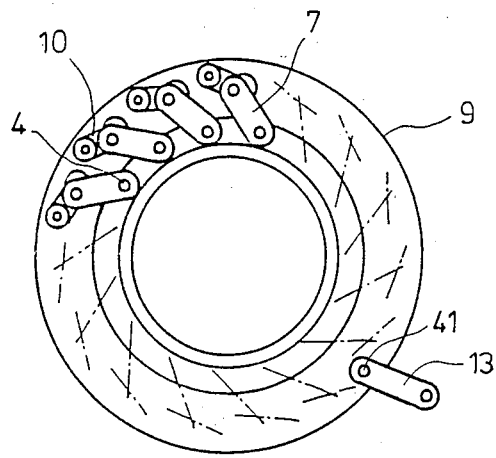
FIG. 12 is a sectional view taken along the line C—C of FIG. 11.

Referring next to FIGS. 9 and 10, means for preventing leakage of exhaust gases from the mechanism for angle-displacing the nozzle blades will be described.

In the turbocharger shown in FIG. 9, the space 8 is communicated through a hose 29 with a compressed air source (not shown) to maintain the pressure in the space 8 higher than the pressure of exhaust gases. Then the air introduced into the space 8 flows through the gap between the gas outlet cover 2 and the shroud 3 toward the exhaust gas outlet 12 so that the mechanism for angle-displacing the nozzle blades is cooled by the air. The gas leaking through the space between a bearing 26 and a shaft 21 is low-temperature air and has no problem due to the leakage thereof.

Instead of the hose 29, as shown in FIG. 10, the space 8 may be communicated with the gas outlet 12. More particularly, at the joint between the shroud 3 and the gas outlet cover 2, the engaging portion of the shroud is decreased in diameter or the gas outlet cover is increased in diameter, whereby a gap δ is defined therebetween.

Since the space 8 is communicated with the gas outlet 12, the gases with which the space 8 is filled leak into the gas outlet 12 in which exhaust gases flow at a high velocity. The exhaust gases in the outlet 12 produce the ejection action to positively suck the gases through the gap δ. As a result, no exhaust gases leak through the space between the shaft 21 and the bearing 26 to the exterior.

Alternatively, a groove or grooves may be formed axially on the engaging portion or a radial through hole or holes may extend through the shroud 3 or the gas outlet cover 2.

What is claimed is:

1. In a variable displacement turbocharger comprising a turbine casing, a shroud, a gas outlet cover, said turbine casing, said shroud and said gas outlet cover together defining a closed doughnut-shaped space, a nozzle driving ring rotatably located in said space, nozzle blades each having a nozzle shaft extending therefrom, and a link for interconnecting said nozzle shaft and said nozzle driving ring, said nozzle driving ring being adapted to be rotatively driven from outside said space, an improvement comprising projection means on the gas outlet cover for rotatably supporting the nozzle driving ring.

2. The turbocharger according to claim 1 wherein the projection means is formed integral with said gas outlet cover.

3. The turbocharger according to claim 1 wherein the projection means is in the form of a continuous circular ring.

4. The turbocharger according to claim 1 wherein the projection means is in the form of a plurality of column-like projections.

5. The turbocharger according to claim 1 wherein a sliding contact surface of said projection means is hardened.

6. The turbocharger according to claim 4 wherein each of said projections comprises a centering fixture securely held in position by means of a countersunk-head screw.

7. The turbocharger according to claim 4 wherein radius of curvature of at least end portions of a sliding contact surface of the projection is smaller than that of an inner peripheral surface of the nozzle driving ring.

8. The turbocharger according to claim 4 wherein some of the projections that are disposed at a position where a load transmitted from the nozzle driving ring acts have enlarged contact surfaces while contact surfaces of the remaining projections are small in area.

9. The turbocharger according to claim 1 wherein the shroud is formed with a protruded ring portion adapted to engage with the nozzle blade at an angle in excess of its maximum angle.

10. The turbocharger according to claim 4 wherein at least one of the projections is caused to associate with the nozzle driving ring for stoppage of the latter when the nozzle blade is at the maximum opening degree.

11. The turbocharger according to claim 1 wherein the nozzle shaft has a uniform diameter throughout its length and an end face of a bearing for support of the nozzle shaft directly contacts the nozzle blade.

12. The turbocharger according to claim 1 wherein a side surface of the nozzle blade adjacent to the shroud is inclined in a direction away from the shroud.

13. The turbocharger according to claim 1 wherein compressed air is introduced into said space.

14. The turbocharger according to claim 1 wherein said space and the gas outlet are intercommunicated with each other.

15. The turbocharger according to claim 1 wherein said nozzle driving ring is slidably clamped at its periphery between said turbine casing and said gas outlet cover for rotatable accomodation thereof in said doughnut-shaped space.

* * * * *